(No Model.) 2 Sheets—Sheet 1.
C. H. SEEGER.
DENTAL ENGINE.
No. 421,323. Patented Feb. 11, 1890.
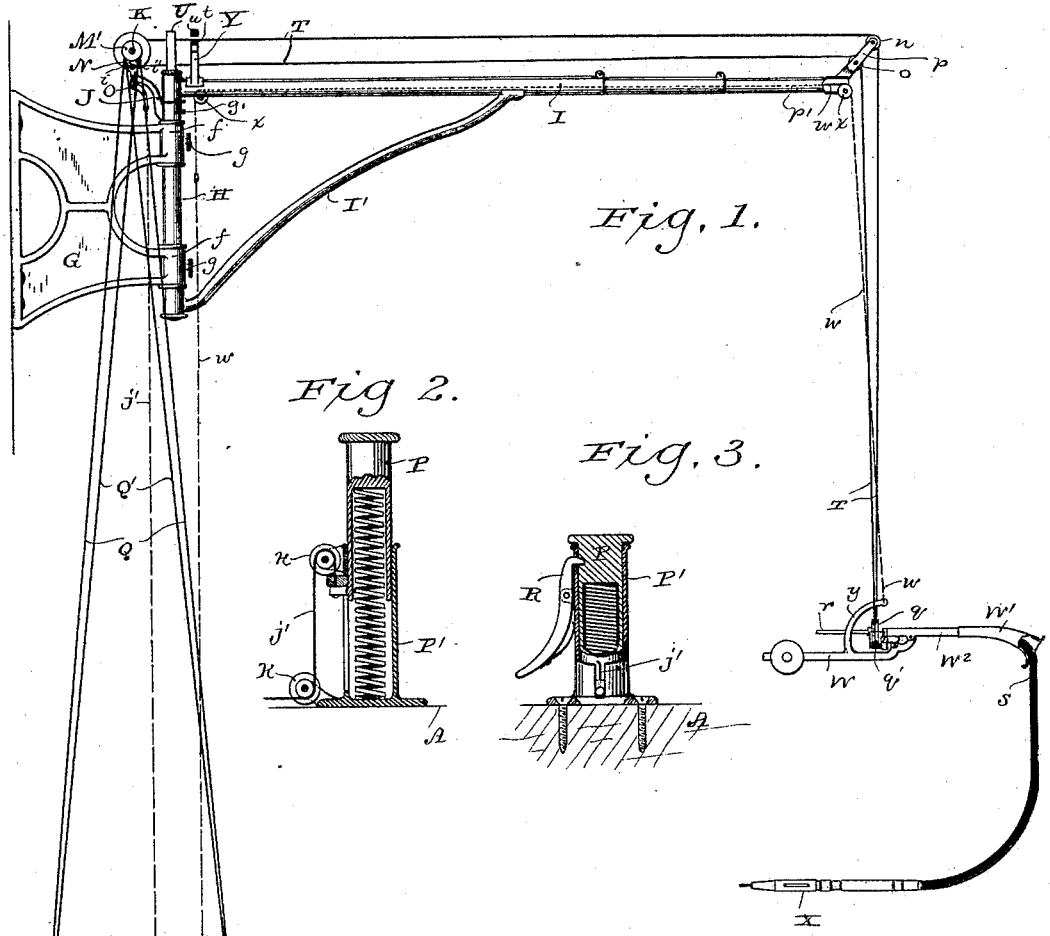
Fig. 1.
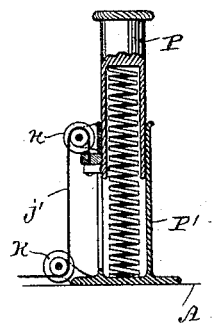
Fig. 2.
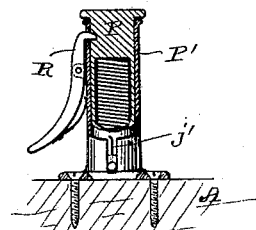
Fig. 3.
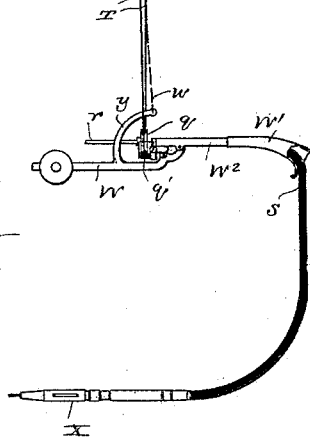
Fig. 4.
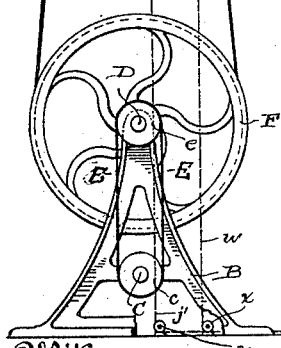
Witnesses
Geo. W. Young
Wm Klug
Inventor
Carl H. Seeger
By Stout & Underwood
Attorneys (No Model.) 2 Sheets—Sheet 2.
C. H. SEEGER.
DENTAL ENGINE.
No. 421,323. Patented Feb. 11, 1890.
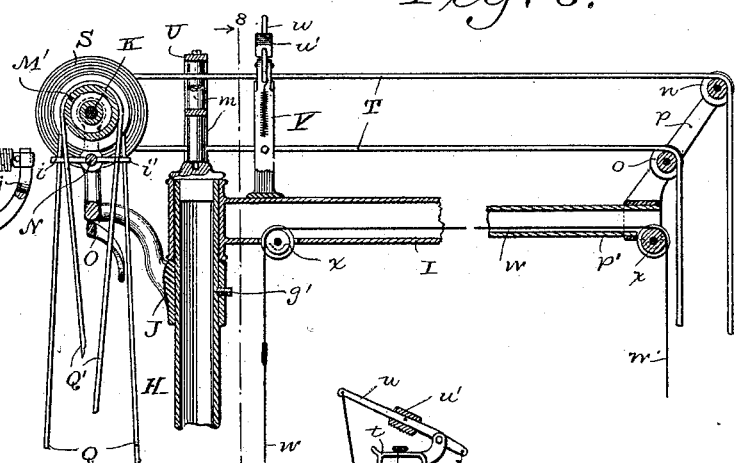
Fig. 5. Fig. 6.
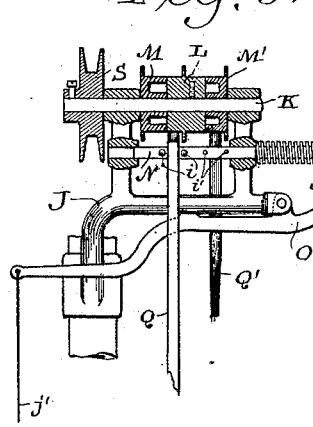
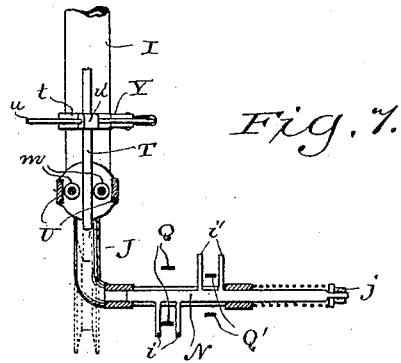
Fig. 7.
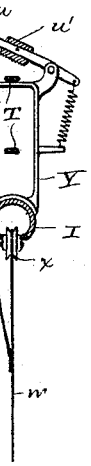
Fig. 8.
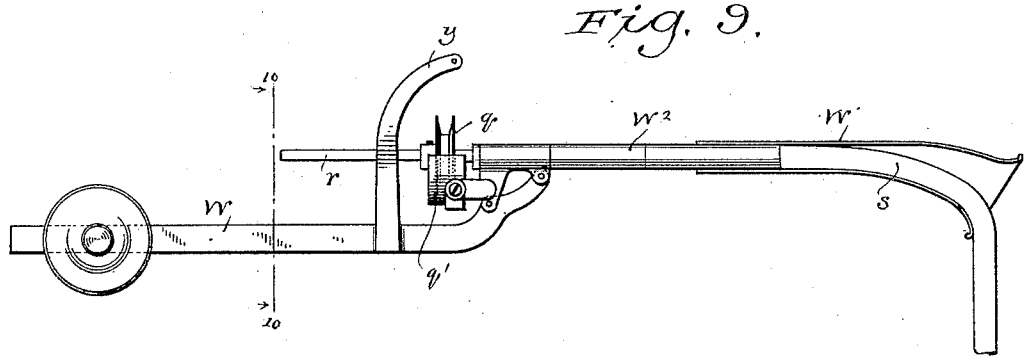
Fig. 9.
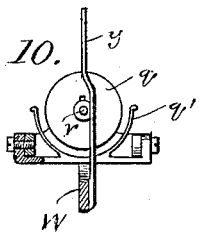
Fig. 10.
Witnesses
Geo. W. Young
Wm. Klug
Inventor
Carl H. Seeger
By Stout & Underwood
Attorneys
N. PETERS, Photo-Lithographer, Washington, D. C.

UNITED STATES PATENT OFFICE.

CARL H. SEEGER, OF MANITOWOC, WISCONSIN.

DENTAL ENGINE.

SPECIFICATION forming part of Letters Patent No. 421,323, dated February 11, 1890.

Application filed July 1, 1889. Serial No. 316,233. (No model.)

*To all whom it may concern:*

Be it known that I, CARL H. SEEGER, of Manitowoc, in the county of Manitowoc, and in the State of Wisconsin, have invented certain new and useful Improvements in Dental Engines; and I do hereby declare that the following is a full, clear, and exact description thereof.

My invention relates to dental engines; and it consists in certain peculiarities of construction and combination of parts, to be hereinafter described with reference to the accompanying drawings, and subsequently claimed.

In the drawings, Figure 1 represents a side elevation of a dental engine embodying my improvements; Figs. 2 and 3, detail sectional views illustrating the operation of a spring-plunger that constitutes part of my invention; Fig. 4, a detail front elevation of the drive-gear; Fig. 5, a detail vertical longitudinal section of a portion of my invention; Fig. 6, a detail sectional view of the upper portion of the engine; Fig. 7, a detail horizontal section illustrating the belt-shifter, belt-guide, and clutch for stopping the travel of the belt; Fig. 8, a detail sectional view on line 8 8, Fig. 6; Fig. 9, a side elevation, partly in section, of a counterbalanced holder for the flexible shaft employed in the class of devices to which my invention relates; and Fig. 10, a detail sectional view on line 10 10, Fig. 9.

Referring by letter to the drawings, A represents a floor, to which is attached two standards B, the latter being provided with bearings for shafts C D. The shaft C is driven by any suitable motor, and carries a tight pulley $b$ and loose pulley $c$ for belt-connection E, with similar pulleys $d$ $e$ on the shaft D, a double-grooved tight pulley F being also carried by the latter shaft, as is best illustrated in Fig. 4.

Rigidly secured to a wall or other suitable support at a certain elevation above the standards B is a bracket G, provided with eyes $f$ for a vertical rod H, the latter being retained in said bearings by means of set-screws $g$, to form a bearing for the arms I I' of a swinging bracket. Keyed to the vertical arm H of the swinging bracket by means of a screw $g'$ or other suitable means is a frame J, provided with bearings for a shaft K, the latter being provided with a centrally-flanged tight pulley L and two loose pulleys M M', these latter pulleys being arranged on opposite sides of the tight pulley and provided at their outer ends with flanges, as is best illustrated in Fig. 5. The frame J is also provided with bearings for a spring-controlled sliding rod N, the latter having lateral projections $i$ $i'$ arranged in pairs on opposite sides of said rod. The outer end of the sliding rod engages a slot $j$ in the adjacent end of a lever O, pivoted to the frame J, and a cord, wire, or other flexible connection $j'$ unites the other end of said lever with a spring-controlled plunger P, arranged to operate in a casing P', attached to the floor A, said flexible connection being guided by a series of suitably-arranged pulleys $k$, as shown in Figs. 1 and 2. A straight belt Q and crossed belt Q' are arranged in the grooves of pulley F to pass between the flanges on the opposing tight and loose pulleys M L M' on the shaft K, as well as between the projections $i$ $i'$ on the sliding rod N.

When the lever O is in its normal position, the straight belt Q will be on the tight pulley L and the crossed belt Q' on the loose pulley M'; but when the spring-controlled plunger P is forced down in its casing P' said lever will be operated to slide the rod N and thereby shift the straight belt onto the loose pulley M and the crossed belt onto the tight pulley, said plunger being retained in its depressed position by means of a spring-latch R, pivotally connected to the casing, as illustrated in Fig. 3.

By means of the construction just described the rotation of the shaft K may be readily reversed, the spring-plunger being preferably arranged beneath a dental chair, so as to be within easy reach of the operator's feet.

Fast on the shaft K is a pulley S for a belt T, that runs between guide-rollers $m$, journaled in a frame U, screw-threaded to the upper end of the vertical rod H, and also over pulleys $n$ $o$, that have their bearings in a bracket $p$ on a telescopic extension $p'$ of the horizontal arm I of the swinging bracket above described, and said belt is finally run on a pulley $q$, fast to a shaft $r$, that has its bearings in a counterbalanced holder W, the latter shaft having a flexible connection $s$ with a dental tool X, as is best illustrated in Fig. 1.

Supported on the arm I of the swinging bracket is a vertical frame Y, provided with a guide $t$ for the belt T, and pivoted to said frame is a spring-controlled lever $u$, provided with a clutch-block $u'$, said lever being connected by a cord $v$ with another cord $w$, that travels over a series of suitably-arranged pulleys $x$, to connect an arm $y$ on the counterbalanced holder W with a spring-controlled plunger Z, that operates in a casing Z', adjacent to the plunger P, above described.

By depressing the plunger Z the counterbalanced holder is elevated to slacken the belt T, and at the same time the lever $u$ is operated to cause a grip of the clutch-block $u'$ on said belt, whereby the latter is instantly checked and the operation of the dental tool stopped.

The plungers P Z and their respective casings are precisely alike, and both are held in their depressed position by a spring-latch such as shown in Fig. 3.

To prevent the belt T from slipping off the the pulley $q$, I attach a guard $q'$ to the holder W, this construction being best illustrated in Fig. 10.

In order to prevent the flexible connection $s$ from breaking off at the point where it bends to depend in a vertical direction, I employ a tube W', having a flaring and curved outer end, the inner end of said tube being slipped onto the sleeve $W^2$, that forms part of said holder.

The flexible connection $s$ follows the curve of the tube W', and the flaring outer end of said tube permits said flexible connection to move up and down as the dental tool is manipulated by the operator.

In case the dental engine is run by other than foot-power, I would connect the source of power with a spring-controlled plunger similar to those above described, and arrange such plunger adjacent to the ones shown, so that said power may be regulated by the operator's foot.

The spring-plunger above described forms the subject of a separate application for patent filed November 25, 1889, Serial No. 331,581.

Having thus described my invention, what I claim as new, and desire to secure by Letters Patent, is—

1. In a dental engine, the combination of a swinging bracket, a holder provided with bearings, a shaft arranged in the bearings, a dental tool flexibly connected to the shaft, a suitably-arranged spring-controlled plunger, a cord or analogous means extended along the bracket to unite said holder and plunger, and a belt-and-pulley gear for operating the tool-shaft, substantially as set forth.

2. In a dental engine, the combination of a swinging bracket, a counterbalanced holder provided with bearings, a shaft arranged in the bearings, a dental tool flexibly connected to the shaft, a suitably-arranged spring-controlled plunger, a cord or analogous means extended along the bracket to unite said holder and plunger, and a belt-and-pulley gear for operating the tool-shaft, substantially as set forth.

3. In a dental engine, the combination of a swinging bracket, a holder suspended from the bracket and provided with bearings, a shaft arranged in the bearings, a dental tool flexibly connected to the shaft, a pulley on the shaft, a counter-shaft carried by said bracket and provided with a power-transmitting pulley, a belt arranged on said pulleys, a tight pulley and two loose pulleys arranged on the counter-shaft, a suitably arranged and driven double pulley, a straight belt normally connecting the double pulley and said tight pulley on the counter-shaft, a crossed belt normally arranged to connect said double pulley and one of the loose pulleys on said counter-shaft, a spring-controlled sliding rod carried by the swinging bracket and provided with projections arranged to straddle said belts, a lever connected to the rod, a spring-controlled plunger, and a cord or analogous means connecting the lever and plunger, substantially as set forth.

4. In a dental engine, the combination of a swinging bracket, a holder provided with bearings, a shaft arranged in the bearings, a dental tool flexibly connected to the shaft, a pulley carried on the shaft, a counter-shaft carried by said bracket and provided with a power-transmitting pulley, a belt arranged on said pulleys, a suitably-arranged spring-controlled plunger, a cord or analogous means extended along the swinging bracket to unite the holder and plunger, a spring-controlled clutch-lever pivoted to said frame in opposition to the latter and said belt, a cord or analogous means uniting the lever with the cord that connects said holder and plunger, and a belt-and-pulley gear for actuating said counter-shaft, substantially as set forth.

5. In a dental engine, the combination of a shaft, a system of belts and pulleys arranged to actuate the shaft in either direction, a shifter for the belts, and a spring-controlled plunger flexibly connected to the shifter, substantially as set forth.

6. In a dental engine, the combination of a swinging bracket, a holder suspended from the bracket and provided with bearings, a shaft arranged in the bearings, a dental tool flexibly connected to the shaft, a pulley on said shaft, a counter-shaft carried by said bracket and provided with a power-transmitting pulley, a belt arranged on said pulleys, a clutch for the belt, and a spring-controlled plunger flexibly connected to said holder and belt-clutch, substantially as set forth.

7. In a dental engine, the combination of a holder provided with bearings, a shaft arranged in the bearings, a dental tool flexibly connected to the shaft, and a tubular support for the flexible connection having a curved and flaring end, substantially as set forth.

In testimony that I claim the foregoing I have hereunto set my hand, at Manitowoc, in the county of Manitowoc and State of Wisconsin, in the presence of two witnesses.

CARL H. SEEGER.

Witnesses:
  JOS. P. STAEHLE,
  K. PIENING.